Patented Oct. 25, 1932

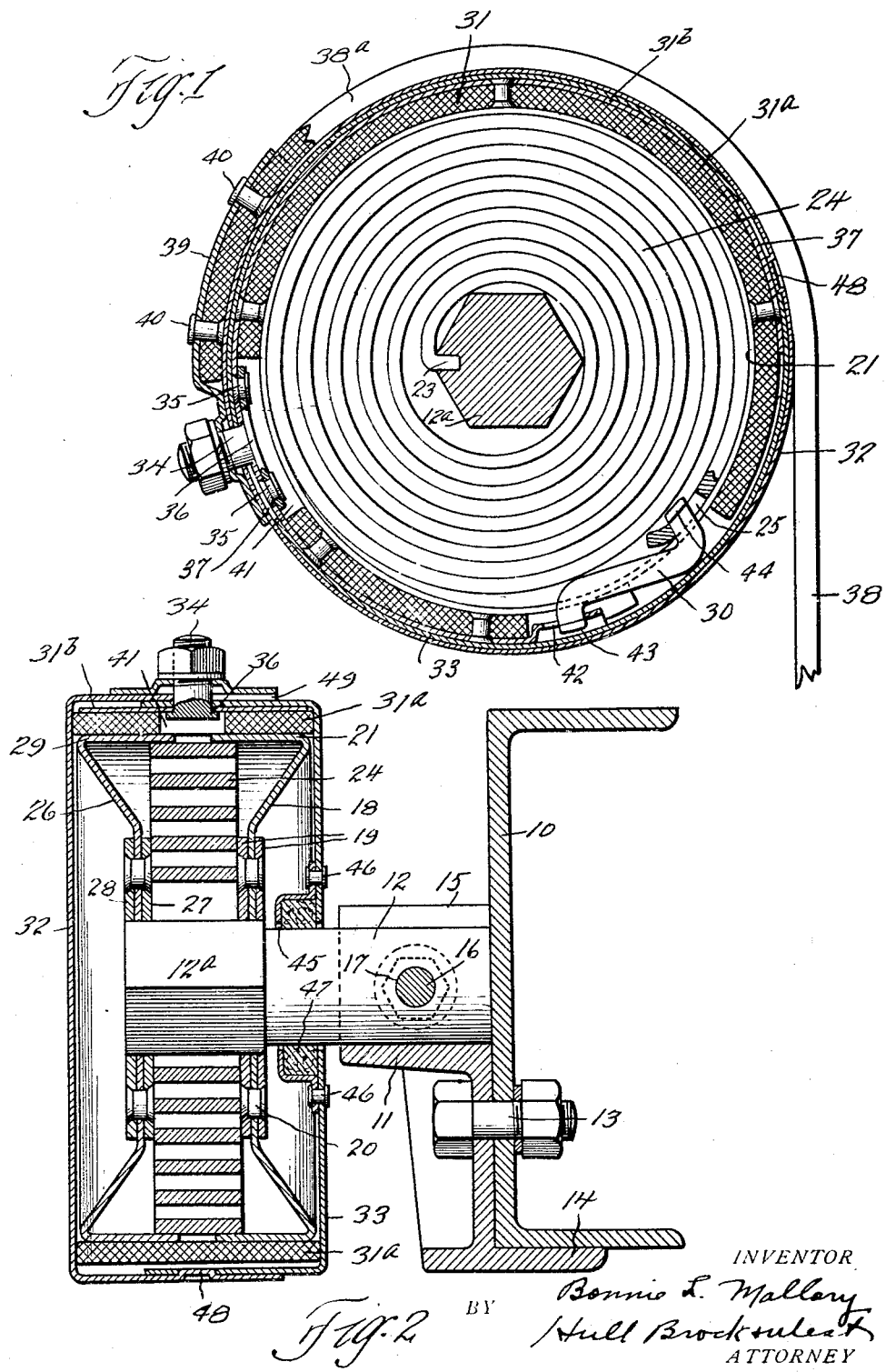

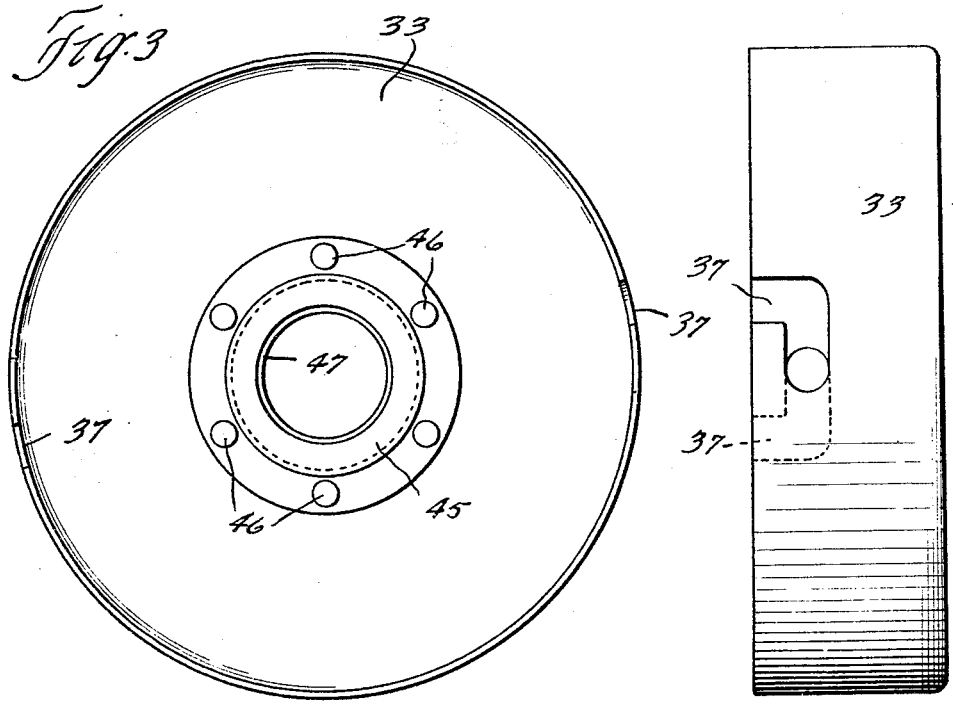
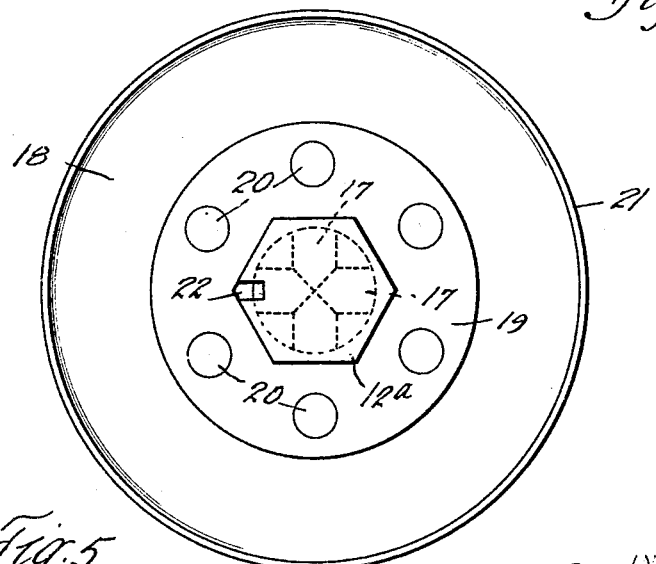

1,884,034

UNITED STATES PATENT OFFICE

BONNIE L. MALLORY, OF CLEVELAND HEIGHTS, OHIO, ASSIGNOR TO THE CLEVELAND SHOCK ABSORBER COMPANY, OF CLEVELAND, OHIO, A CORPORATION OF OHIO

SHOCK ABSORBER

Application filed November 18, 1930. Serial No. 496,408.

This invention relates to a shock absorber of the brake type adapted for use on automobiles or other road vehicles provided with springs and adapted to prevent excessive rebound of the body of such vehicle.

The objects of the invention are to provide a device of this character which shall be as simple as is consistent with the embodiment of the improved features of operation. A further object is to provide a device in which one of the braking members is freely floating with respect to the other and which shall at the same time be capable of sealing a lubricant therein.

With the foregoing and other objects in view as will become apparent, the invention consists in the details of construction and arrangement of parts as hereinafter fully described and claimed.

Fig. 1 is a sectional view taken at right angles to the axis of rotation of the rotary parts; Fig. 2 is a section taken at right angles to the section of Fig. 1; Fig. 3 is an interior elevation of one member of the housing; Fig. 4 is a side elevation of the parts shown in Fig. 3; and Fig. 5 is an elevation of one end of the device with the housing and brake band removed.

In the drawings I have shown the frame member 10 of a vehicle such as an automobile and a section of the fitting 11 by which the post 12 is secured to such frame member. The fitting 11 is secured to the frame 10 by a bolt 13 and has a projection 14 extending under the frame 10. A post receiving portion 15 is provided with a split upper portion and holes extending in the direction of the length of the frame 10 to receive a bolt 16 for securement of the post 12 in fixed relation with respect to the fitting 11 and frame 10. The post 12 preferably has intersecting openings 17 extending therethrough for the purpose of receiving the bolt 16 and providing for adjustment of the same by even multiples of 90°.

As indicated, the post 12 has a cylindrical portion adjacent the frame 10 and a polygonal portion 12$^a$ at the end thereof. The portion 12$^a$ may be hexagonal as shown or may have any desired number of faces. Swaged upon the polygonal portion 12$^a$ of the post 12 adjacent the cylindrical portion is a drum member 18 having the central opening thereof fitting closely over and tightly embracing the portion 12$^a$. The drum member 18 includes a pair of reinforcing plates 19 secured thereto as by means of rivets 20 and a cylindrical drum portion 21. A notch 22 is provided in the portion 12$^a$ of the post 12 for the reception of one end 23 of a spiral spring 24. The spring 24 is provided at its other end with a slot 25 for a purpose hereinafter described. Removably positioned on the end of the portion 12$^a$ of the post 12 is a second drum member 26 including similar reinforcing plates 27 and 28 and a drum portion 29. As will be seen, the spring 24 is completely enclosed by the drum members 18 and 26 and spaces the same apart centrally of the spring. The space between the edges of the drum portions 21 and 29 permits an S-shaped hook member 30 to extend outwardly and connect the spring which is inside the drum members with the brake band 31 which is outside thereof. The spacing also permits the riveting together of the friction band 31$^a$ and the spring metal band 31$^b$, which make up the brake band, in such a way that the rivet heads do not come in contact with the drum portions 21 and 29, but lie between them.

The brake band 31 is connected to a pair of housing members 32 and 33 by means of a stud 34 secured to the spring metal member 31$^b$ by rivets 35 extending through a curved elongated head portion 36 and through slots 37 and 49 in said housing members 32 and 33. The stud 34 also serves as a means of anchoring the strap 38 which is adapted to be connected to the vehicle axle and which includes a web portion 38ª and a metallic attaching portion 39 secured thereto by means of rivets 40 and being provided with an opening which receives the stud 34. A cut-out portion 41 is provided in the friction band 31ª to receive the portion 36 of the stud 34 and the attaching rivets 35. The S-shaped hook 30 has one end connected in the slot 25 and the other in a slot 42 in the spring metal portion 31ᵇ, and the part of the spring metal band which contains the slot 42 is depressed inwardly whereby a space is made to receive the head 43 of the S-shaped hook 30. The heads 43 and 44 of the hook 30 are each of a width to be received in the slots 25 and 42 but project over the edges of said slots when the device is assembled whereby to secure the spring 24 and the brake band 31 together in such a way that they shall not become detached in operation.

The housing member 33 is provided with an opening centrally thereof to receive the post 12. An annular member 45 is attached by means of rivets 46 to the wall 33 and has its central opening concentric with the opening in the wall 33 which receives the post 12. These openings are somewhat larger than the post 12 to permit of a limited radial movement of the housing with respect to such post. As will be seen from the drawings, the wall 33 and the annular member 45 provide a channel adjacent the post 12 and this channel contains a resilient packing 47 which maintains sealing relation of the housing around the post 12 irrespective of the radial movement of the housing. The various parts of the device are so proportioned that only a very slight radial motion of the housing is necessary to bring the same into such relation as to grip the brake band between itself and the drum members. It is evident that this is a desirable feature since the greatest possible approximation to concentricity between the drums and the housing results in the greatest gripping efficiency. In constructing this device, the parts are proportioned so as to approach this ideal as nearly as possible without unduly retarding the return of the housing under the influence of the spring 24 when the frame and axle of the vehicle approach each other.

The housing which surrounds the braking mechanism and in connection with which the sealing means 47 is adapted to maintain lubricant therein, consists of two parts 32 and 33. The housing member 33, as indicated in Fig. 4, is provided with a pair of bayonet slots, the corresponding parts of which are diametrically opposed. The other member contains one notch and one circular projection 48 diametrically opposed thereto. In assembling the device, the housing member 33 will be placed in position over the drum assembly and brake band with the stud 34 entering one of the bayonet slots but not rotated to locking position. The housing member 32 will then be placed in telescopic relation to the housing member 33 with its notch embracing the stud 34 as seen in Fig. 2. In this position the projection 48 will enter the opposite bayonet slot of the housing 33 as it could not do if the stud had already been rotated into locking position in the bayonet slot in the part 33. After the two housing members are thus positioned, the member 33 can be rotated with respect to the other member to bring the two bayonet slots into locking relation with the stud 34 and the projection 48. When the member 39 is then placed over the stud 34 and the nut tightened on the stud, the housing parts will be locked together in close sealing relation and by the aid of the packing 47 will be able to retain lubricant inside the casing over long periods.

While I have illustrated and described a preferred embodiment of my invention, I wish it understood that I am not limited to details shown, but may carry out the same in numerous forms without departing from the spirit of the invention as defined in the appended claims.

Having thus described my invention, what I claim is:

1. In a shock absorber a post non-rotatably mounted with respect to a vehicle member, said post having a polygonal portion and a circular portion, drum means non-rotatably supported on said polygonal portion, a housing radially and rotatably movable with respect to said post, a brake band between the drum means and housing, spring means causing gripping of said band between said housing and drum means, and a strap adapted to be connected to another vehicle member and to rotate the housing with respect to the drum, said housing enclosing said spring and drum means and having a part in sealing relation around said circular portion of the post at all times.

2. In a shock absorber a post non-rotatably mounted with respect to a vehicle member, said post having a polygonal portion and a circular portion, a pair of drum members non-rotatably supported on said polygonal portion, a housing radially and rotatably movable with respect to said post, a brake band between the drum members and housing, spring means between said drum members causing gripping of said band between said housing and drum members, and a strap adapted to be connected to another vehicle member and to rotate the housing with respect to the drum, said housing enclosing said spring and drum means and having a part in sealing relation around said circular portion of the post at all times.

3. In a shock absorber a post adapted to be fixed upon a vehicle frame, a pair of similar, spaced drum members non-rotatably mounted upon said post, a spiral spring between said drum members and connected at one end to said post, a brake band surrounding said drum members and connected to the other end of said spring, a housing enclosing said drum and brake band and including means for sealing the interior against escape of lubricant between the same and said post, said means including a packing which will allow radial and rotatory motion of said housing with respect to the post while maintaining the seal.

4. In a shock absorber a post adatped to be fixed upon a vehicle frame, a pair of similar, spaced drum members non-rotatably mounted upon said post, a spiral spring between said drum members and connected at one end to said post, a brake band surrounding said drum members and connected to the other end of said spring, a housing enclosing said drum and brake band and including means for sealing the interior against escape of lubricant between the same and said post, said means including a packing which will allow radial and rotatory motion of said housing with respect to the post while maintaining the seal, one of said drum members being swaged tight upon said post and the other being removable.

5. In a shock absorber a post adapted to be fixed upon a vehicle frame, a pair of similar, spaced drum members non-rotatably mounted upon said post, a spiral spring between said drum members and connected at one end to said post, a brake band surrounding said drum members and connected to the other end of said spring, a housing enclosing said drum and brake band and including means for sealing the interior against escape of lubricant between the same and said post, said means including a packing which will allow radial and rotatory motion of said housing with respect to the post while maintaining the seal, said housing being made in two parts tightly, telescopically fitting together and one part being provided with oppositely disposed bayonet slots and the other having a projection adapted to cooperate with one of said bayonet slots and an oppositely disposed slot, said brake band having a stud attached thereto intermediate its ends and extending through one pair of said bayonet slots, and a strap wound on said housing and attached to said stud and adapted to connect with a vehicle axle.

6. In a shock absorber a post adapted to be fixed upon a vehicle frame, a pair of similar, spaced drum members non-rotatably mounted upon said post, a spiral spring between said drum members and connected at one end to said post, a brake band surrounding said drum members and connected to the other end of said spring, a housing enclosing said drum and brake band and including means for sealing the interior against escape of lubricant between the same and said post, said means including a packing which will allow radial and rotatory motion of said housing with respect to the post while maintaining the seal, said housing being made in two parts tightly, telescopically fitting together and one part being provided with oppositely disposed bayonet slots and the other having a projection adapted to cooperate with one of said bayonet slots and an oppositely disposed slot, said brake band having a stud attached thereto and extending through one of said bayonet slots, and a strap wound on said housing and attached to said stud and adapted to connect with a vehicle axle.

7. In a shock absorber a post adapted to be fixed upon a vehicle frame, a pair of similar, spaced drum members non-rotatably mounted upon said post, a spiral spring between said drum members and connected at one end to said post, a brake band surrounding said drum members and connected to the other end of said spring, a housing enclosing said drum and brake band and including means for sealing the interior against escape of lubricant between the same and said post, said means including a packing which will allow radial and rotatory motion of said housing with respect to the post while maintaining the seal, said brake band comprising a friction band and a thin spring metal band attached together, and a stud connected to said spring metal band and extending through and clamped to said housing.

8. In a shock absorber a post adapted to be fixed upon a vehicle frame, a pair of similar, spaced drum members non-rotatably mounted upon said post, a spiral spring between said drum members and connected at one end to said post, a brake band surrounding said drum members and connected to the other end of said spring, a housing enclosing said drum and brake band and including means for sealing the interior against escape of lubricant between the same and said post, said means including a packing which will allow radial and rotatory motion of said housing with respect to the post while maintaining the seal, said brake band comprising a friction band and a thin spring metal band attached together, and a stud connected to said spring metal band and extending through and clamped to said housing, said friction band having a portion cut away to receive the head of said stud.

9. In a shock absorber a post adapted to be fixed upon a vehicle frame, a pair of similar, spaced drum members non-rotatably mounted upon said post, a spiral spring between said drum members and connected at one end to said post, a brake band surrounding said drum members and connected to the other end of said spring, a housing enclosing said drum and brake band and including means for sealing the interior against escape of lubricant between the same and said post, said means including a packing which will allow radial and rotatory motion of said housing with respect to the post while maintaining the seal, said brake band comprising a friction band and a thin spring metal band attached together, the connection between said spring and said brake band including a slot in said spring, a depressed slotted portion of said spring metal band and an S-shaped hook member adapted for cooperation with said slots.

In testimony whereof, I hereunto affix my signature.

BONNIE L. MALLORY.